3,371,996
DIAMOND GROWTH PROCESS
Henry J. Hibshman, 6 Crabapple Lane,
Plainfield, N.J. 07060
Filed Jan. 20, 1964, Ser. No. 338,766
5 Claims. (Cl. 23—209.1)

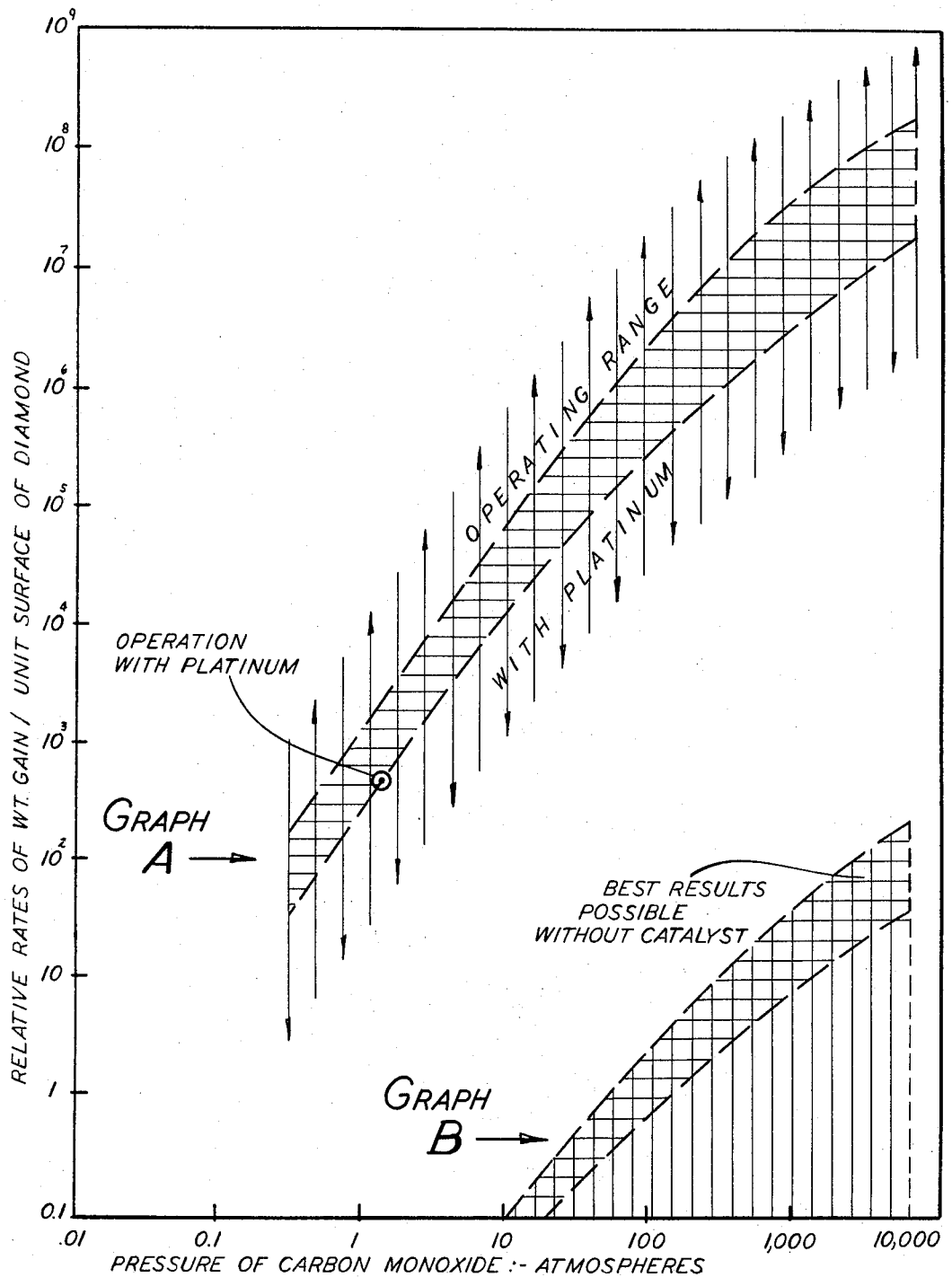

ABSTRACT OF THE DISCLOSURE

Diamonds are grown from diamond seed particles by contacting the seed particles with a gas consisting essentially of CO in the presence of catalytic amounts of at least one metal selected from the group consisting of the precious metals and nickel at temperatures in the range of 600° C. to 1100° C. and at pressures of 1 to 2000 atmospheres.

---

This invention relates to a process for the growth of diamond from diamond seed crystals in the presence of certain metals which have been found to greatly increase the growth rate of the reaction involved, probably acting as a catalyst therefor via production of atomic hydrogen.

In my copending United States patent application Ser. No. 272,670, filed Apr. 12, 1963, there is described a process whereby the growth of diamond is effected by contacting diamond seed particles with a carbon-containing gas whose carbon atoms have a free energy potential greater than that of diamond under temperature and pressure conditions at which the diamond is thermodynamically metastable.

It has now been found that the rate of growth of diamond in said process is accelerated by carrying out the reaction in the presence of at least one metal of the group consisting of the precious metals and nickel. The term "precious metals," as used herein, means the metals platinum, iridium, osmium, rhenium, gold, palladium, ruthenium, rhodium, and silver or any two or more of them.

It has further been found that the reaction rate is further enhanced by the presence of controlled amounts of hydrogen.

ACTIVE NASCENT CARBON

Generally, the carbon-containing gas employed in the practice of the invention is a gaseous source of active nascent carbon. By the term "active nascent carbon" is meant a carbon atom or radical containing carbon having a free energy potential higher than that of the diamond subject to growth under the conditions of the process. This is distinguished from a nascent carbon having a free energy potential between that of diamond and graphite under similar temperature and pressure conditions. Growth of the diamond is accomplished by virtue of the hitherto unknown property of diamonds to grow larger in the proper environment in spite of the fact that the diamond is thermodynamicaly metastable in that environment. By the term "metastable" is meant that the diamond is not spontaneously reverted to graphite under such conditions of temperature and pressure that, thermodynamically, the transition tends to occur.

Gaseous active nascent carbon may be prepared in a number of ways, e.g., by vaporization from a source such as graphite or amorphous carbon by electric arcing, by induction heating, by resistance heating or by cathode sputtering techniques, etc. However, the preferred sources are (a) carbon monoxide, which, under conditions of deposition in the growth process, reacts to form C and $CO_2$ according to the following equilibria:

$$2CO \rightleftharpoons C \text{ (diamond)} + CO_2$$
$$2CO \rightleftharpoons C \text{ (graphite)} + CO_2$$

and (b) mixtures of carbon monoxide and carbon dioxide in which the latter content of the mixture is preferably kept below the equilibrium value as later explained.

The gaseous active nascent carbon of such high free energy tends rapidly to lose its excess free energy and revert to graphite. However, if such gaseous active nascent carbon, while possessing such high free energy is brought into and maintained in contact with a suitable solid diamond seed surface, preferably a diamond surface free of contaminants such as adsorbed gases, it tends to stabilize at a higher free energy level in the form of diamond. The diamond surface brings such carbon into its crystal structure and thus grows larger. The diamond seed surface or nucleus must be at a sufficiently high temperature, but in no event above about 1200° C., so that any activation energy for the combination is overcome. For example, in the case of CO reacting to deposit carbon atoms on a diamond seed crystal, the temperature of the diamond nucleus must be in the range of about 600° C. to about 1100° C. depending upon the pressure employed. At about 1 atmosphere pressure in the absence of catalytic substances the temperature must be in excess of about 837° C. roughly or no deposition occurs; while at about 1000 atmospheres pressure temperatures as low as about 637° C. roughly are capable of producing deposition of carbon into the diamond crystal lattice. It should be borne in mind that if a temperature much above 1100° C. is employed, graphite will be deposited on the diamond surface to the exclusion of diamond carbon and no diamond growth occus. Temperatures greatly above 1100° C. are to be avoided.

Carbon phase diagrams can be prepared from available thermodynamic data and a fairly accurate curve established representing a line of transition between temperature-pressure areas in which diamond and graphite are respectively the stable form of carbon. Within the graphite stable area there is an area where, it can be demonstrated, the diamond is metastable. It is within the temperature-pressure conditions of this metastable area that the present invention is practiced and preferably in the more easily obtained lower pressure region, viz., pressures below about 2000 atmospheres and temperatures below about 1100° C.

In the practice of this invention carbon is produced with a free energy higher than that of metastable diamond and while the carbon is in such an energy condition it is brought into contact with the diamond seed surface before the carbon loses its high free energy. At all pressures below the transition pressure (as shown on a carbon phase diagram) the free energy of carbon in a diamond is higher than that in graphite. At approximately atmospheric pressures and temperatures this free energy difference amounts to about 390 calories, while at 1000° C. it is about 1200 calories at one atmosphere pressure and about 800 calories at 20,000 atmospheres. Under ordinary temperature and pressure conditions the diamond tends to become graphite but is prevented from doing so by the high activation energy required for the transition.

GROWTH RATES

There are several competing chemical reactions occurring simultaneously under the conditions favoring practical diamond growth rates, for example:

(1)  Diamond+$H_2$→$CH_4$ (2) Diamond+$H_2$→Numerous other hydrogenated species (3)  Diamond+$H_2O$→CO+$H_2$ (4)  Diamond+$CO_2$→2CO (5)  Diamond+$H_2O$→$CO_2$+$H_2$ (6)  2CO→Diamond+$CO_2$ (7) $H_2 + CO \rightarrow Diamond + H_2O$
(8) $H_2 + CO_2 \rightarrow Diamond + H_2O$
(9) $CH_4 \rightarrow Diamond + H_2$
(10) $CO + H_2O \rightarrow CO_2 + H_2$
(11) $CO_2 + H_2 \rightarrow H_2O + CO$ Similar reactions involving other forms of carbon have been known for decades, and have been studies extensively. However, a satisfactory understanding of their relative or absolute rates at the reaction conditions preferred for diamond growth have never been established with any form of carbon let alone with diamond seed crystals present. When other forms of carbon are present in addition to diamonds, with the possibility of different rates for each reaction with each carbon form, the situation defies analysis. Accordingly, no attempt will be made here to try to explain the growth of diamonds discovered under the conditions of this invention but rather to define the conditions under which the increased growth rate is possible.

The source of diamond seed crystals employed in the growth process of this invention is, preferably, commercial diamond powder or diamond dust available on the market as diamond abrasive or diamond polishing powder. The applicant prefers to assure that the surface thereof, at least in part, is free of contamination such as adsorbed gases prior to use as seed crystals. Such contaminants are removed by a degassing treatment which involves heating the diamond to about 700–800° C. under vacuum of about $10^{-4}$ to $10^{-7}$ mm. of mercury for about 10 minutes. Other contaminants may be removed from the diamond dust by treating with hot dilute mineral acid e.g., HCl, washed with $H_2O$, and dried. Such contaminants should preferably be removed prior to the degassing treatment.

Carbon monoxide employed is preferably pure CO. Even so-called pure cylinder CO, however, contains small amounts of impurities which should be removed. Oxygen even in small amounts is particularly deleterious and should be removed by passing the CO gas over reduced copper, etc. When CO containing several tenths of one percent $O_2$ was passed at atmospheric pressure and at temperatures between 800° C. and 1050° C. over diamond seed crystals, losses in weight of the seeds occurred. However, when the CO was first passed over reduced copper at about 1000° C., and over Drierite, soda lime and activated charcoal, and then over the diamond seeds, gains in weight were obtained.

When CO passes over diamond seed crystals at reaction conditions, $CO_2$ is always formed. When the concentration of $CO_2$ approaches the equilibrium value, the gases must be removed from the reaction zone or the reaction will reverse and consume diamond. This is so because the equilibrium constant for the reaction with graphite and other black forms of carbon is more favorable than for the reaction with diamond. Accordingly, in the vicinities of equilibrium the following cycle takes place:

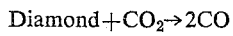

then

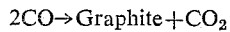

This produces $CO_2$ which can continue the cycle until all the diamond is consumed. Therefore when the $CO_2$ content of CO contacting the seed crystals approaches this concentration, the gas must be replaced with fresh CO feed. In a continuous reaction the CO feed rate must be increased or the reaction conditions made milder. For these reasons the $CO_2$ content of the $CO-CO_2$ mixtures should be carefully controlled and the tolerable level is a function of the temperature and pressure of the reaction. Actually, over the operable temperature and pressure ranges the maximum allowable amount of $CO_2$ varies all the way from about 0.1 of 1% to about 90%. For example, the critical effects of CO purity on the growth and destruction (burning) of diamond carbon has been studied. While carbon grows at 1137° C. and 1 atmosphere pressure with less than 0.1% $CO_2$, the rate of destruction is over ten times faster than the rate of growth when the $CO_2$ content reaches about 2%. On the other hand, when the reaction pressure is raised to 1000 atmospheres, the rate of growth with 2% $CO_2$ present is about 100 times higher than the rate of burning, and remains higher until about 40% $CO_2$ is present.

Temperature for diamond growth from seed crystals by CO treatment should be kept in the range of about 600° C. to not greatly above 1100° C., preferably 900° C. to 1100° C., and the temperature selected must, of course, be correlated for optimum operation to the pressure employed as previously related.

Suitable pressures over the broad temperature range are in the range of 1 atmosphere to 2000 atmospheres, preferably 10 to 2000 atmospheres and more preferably, 50 to 1500 atmospheres. In the specific temperature range of 900 to 1100° C., the pressure range may vary between 50 and 500 atmospheres preferably 65 to 150 atmospheres. In the latter range pressures of 1000 p.s.i.g. to 2000 p.s.i.g. are respresentative.

The presence of hydrogen in the carbon-containing gas further enhances the growth rate employing the metals of this invention, preferably in traces to about 10% by volume based on the CO, and more preferably 0.5 to 5.0%. The upper concentration of hydrogen has not been determined, however, one must stay below the equilibrium values for the reactions favoring the formation of diamond (see equations above). In addition, concentrations favoring competitive destruction reactions over growth reactions are to be avoided.

Reaction times in fixed bed operation run from about 2 to 200 hours, preferably 4 to 100 hours in duration.

The pressure reactor employed in the conduct of this invention was designed to permit continuous flow operation at pressures up to about 40,000 p.s.i.g., and at temperatures as high as 1250° C. The reactor was machined (Reuther Engineering and Machine Co., Newark, N.J.) from a special steel forging (Midvale Steel Co.) and contained 0.41% carbon, 0.63% manganese, 0.22% phosphorous, 0.19% silicon, 3.00% nickel, 0.91% chromium and 0.34% molybdenum. The reactor was a 4" I.D. (8" O.D.) hollow cylinder with Bridgeman unsupported area type packed closures with buttress threads at both ends. The top closure had four electrical leads for heater and thermocouple connections with appropriate Bridgeman unsupported area type seals. Both closures had single axial standard cone type connections for standard 1 mm. I.D. (Amer. Ins. Co.) pressure tubing. All valves, T's, and tubing employed were standard, block type AIC high pressure fittings.

A silica tube, 7 mm. O.D., 5 mm. I.D., was used as a holder for the diamond seeds undergoing growth, sealed in between two sintered silica disks, and placed in the high temperature section of the reactor. One end of the silica tube was connected to the inlet closure (silica to stainless steel ball joint fitting). The opposite end was free and allowed for tube movement due to thermal or mechanical effects. Tube length was such as to provide a short path for the exit gases from the tube to reach the discharge opening.

Silica tube temperature was measured by a centrally located nickel-nickel molybdenum special thermocouple in the annular space between the reaction tube and a second surrounding, larger I.D., silica tube. The Nichrome heating element was coiled on the outside of the larger silica tube and was designed to operate at low voltages fed from a 2 k.v.a. source. Another silica tube surrounded the heater. The high temperature zone was insulated from the rest of the reactor by finely-divided powdered magnesia contained in the interstices between packed ceramic beads.

The reactor could be fed with gas from either high pressure pumps or cylinder pressure, the latter being preferred. In the experimental work applicant employed CO gas from pressure cylinder (Mathieson Co.) feeding the reactor by direct connection to the cylinder and controlling the flow by adjustment of a reactor exit valve. Gas measurement was made by a rotameter on the low pressure side of the control valve.

In start-up, the reactor was first pressured with an inert gas such as $N_2$ or a mixture of $N_2$ and $H_2$. Flow of CO was then started through the vessel and the temperature was raised at a low enough rate so as not to cause reverse flow due to thermal expansion.

To measure the extent of the growth reaction the silica tube was weighed before and after charging with diamond seeds, again after the reaction was halted, and again after treatment of the reaction contents to remove non-diamond forms of carbon, viz., graphite or other black carbon produced and deposited during the reaction. No diamond growth was evidenced which at the same time did not produce some graphite or black carbon deposition. Black deposition is removed by treatment of the diamond with perchloric acid solution (made by mixing potassium perchlorate with fuming nitric acid) or with cleaning solution prepared from potassium dichromate and concentrated sulfuric acid, or by treatment with hydrogen gas under superatmospheric pressure and temperatures around the growth reaction temperatures. Using liquid cleaning solutions the mass is usually subjected to mild heating and treatment continued until the black deposit disappears.

The drawing shows the relative rates of growth, i.e., weight gain of seed per unit of surface as a function of pressure of the carbon-containing gas. Referring to the figure the checkered area of Graph B represents growth rates calculated from the best information available in the literature describing the effect of temperature and pressure on the reaction of CO and various forms of carbon, while the checkered area of Graph A represents growth rate similarly calculated from applicant's data on analogous effect of temperature and pressure based on the results obtained with platinum metal. In each case pressure and temperature rises cause the reaction rate to increase. In the case of platinum the location of the checkered area will vary with the form, amount and distribution of platinum and with the amount of hydrogen present.

Therefore, an operating area is indicated both above and below the checkered area. The actual operating conditions used in the growth of diamonds located the checkered area as indicated. In the absence of catalytic influence (Graph B) no operable region above the checkered area exists.

EXAMPLE

Utilizing the apparatus described, 0.05870 gm. of diamond seed powder (350-450 mesh) was placed in the silica boat together with 0.2878 gm. of granular platinum metal. Carbon monoxide gas (Mathieson cylinder) was fed to the reactor while hydrogen gas was also bled into the system. The feed gas during the reaction varied in composition 95-99 plus percent CO and 5.0% to trace of hydrogen. The run continued for approximately 115 hours. The temperature varied from 880 to 1050° C. averaging 900° C. while the pressure varied little from one atmosphere. Microscopic examination of the product showed obvious growths protruding from the surface of the diamond seeds. Most growths were optically isotropic. After cleaning to remove occasional black deposits the weight gain was 0.00214 (3.64% on diamond charged).

It was noted that the prevalence of black deposits was several orders of magnitude less than that obtained from runs in the absence of platinum and of hydrogen. The applicant, although not attempting to establish a reaction mechanism, speculates that in the presence of platinum the hydrogen is converted to atomic hydrogen which destroys the nuclei of graphite or of other black forms of carbon as rapidly as such nuclei are formed.

The growth reaction described herein can be carried out utilizing the well established fluidized solids technique in which a bed of particulate solid (diamond seed, catalyst, and growth product) is maintained in a fluid condition by passing therethrough at the appropriate superficial velocity the reactant CO gas. In this manner very long runs are possible (beyond the above time periods set for fixed bed reaction) and seed crystals can grow beyond the size limits set by intercrystalline spaces between crystals in fixed beds.

What is claimed is:

1. A solid-gas contacting process for growing diamond on diamond seed particles which comprises providing diamond seed particles and a catalytic amount of a metal selected from the group consisting of the precious metals and nickel, contacting said diamond seed particles and metal with a gas mixture comprising 90.0 to 99.5 volume percent CO and 10 to 0.5 volume percent hydrogen at temperatures between about 600° C. and 1100° C. and at pressures from 1 to 2000 atmospheres.

2. A solid-gas contacting process for growing diamond on diamond seed particles which comprises providing diamond seed particles and a catalytic amount of platinum, contacting said seed particles and platinum with a gas mixture consisting essentially of 90 to 99.5 vol. percent CO and 10 to 0.5 vol. percent hydrogen at temperatures between 600° C. and 1100° C. and at pressure from 1 to 2000 atmospheres.

3. A solid-gas contacting process according to claim 2 in which the temperature is approximately 900° C., the pressure approximately one atmosphere and the hydrogen content of the contacting gas approximately 0.5 to 5%.

4. A process according to claim 2 in which the contacting gas is added to the system for a period of approximately 115 hours.

5. A process according to claim 2 in which the reaction is carried out utilizing the fluidized solids technique.

References Cited

UNITED STATES PATENTS

| | | | |
|---|---|---|---|
| 2,947,610 | 8/1960 | Hall et al. | 23—209.1 |
| 3,030,187 | 4/1962 | Eversole | 23—209.1 X |
| 3,207,582 | 9/1965 | Inoue | 23—209.1 |

EDWARD J. MEROS, *Primary Examiner.*

OSCAR R. VERTIZ, *Examiner.*